United States Patent [19]

Davis et al.

[11] 4,442,571
[45] Apr. 17, 1984

[54] SELF-EJECTING FASTENER STUD

[75] Inventors: George R. Davis, Islip; Robert Hildebrand, Wantagh; Harold Purcell, East Northport, all of N.Y.

[73] Assignee: Dzus Fastener Co., Inc., West Islip, N.Y.

[21] Appl. No.: 405,256

[22] Filed: Aug. 4, 1982

[51] Int. Cl.³ .............................................. A44B 17/00
[52] U.S. Cl. ........................................ 411/552; 24/596
[58] Field of Search ............. 24/221 K, 221 A, 221 R; 411/554, 552

[56] References Cited

U.S. PATENT DOCUMENTS

| | | | |
|---|---|---|---|
| 1,895,672 | 1/1933 | Louchman | 24/221 K |
| 2,340,250 | 1/1944 | Murphy | 24/221 K |
| 2,709,290 | 5/1955 | Rosenthal | 24/221 K X |
| 3,136,017 | 6/1964 | Preziosi | 24/221 K |
| 3,327,363 | 6/1967 | Knight et al. | 24/221 A |
| 3,718,950 | 3/1973 | Engstrom | 24/221 K X |
| 4,227,287 | 10/1980 | Gunther | 24/221 K |

FOREIGN PATENT DOCUMENTS 1004258  9/1965  United Kingdom ................. 411/554

Primary Examiner—Francis K. Zugel
Assistant Examiner—Peter A. Aschenbrenner
Attorney, Agent, or Firm—Kane, Dalsimer, Kane, Sullivan and Kurucz

[57] ABSTRACT

A self-ejecting fastener stud is provided for use with a fastener receptacle to form a fastener assembly for fastening two members together. The stud has an enlarged head portion and a shank portion extending therefrom adapted to extend through an opening in one of the members to be fastened and to engage with a receptacle mounted on the other of the two members to be fastened. The stud has a cam follower and the receptacle has a cam surface positioned so that engagement and relative rotation therebetween will shift the stud and receptacle between fastened and unfastened positions. The stud is adapted to be retained on the one member so that it can be shifted between an inserted position with the head adjacent the one member and an ejected position with the head spaced from the one member. A biasing spring is on the stud tending to direct the stud toward the ejected position so that when the stud is released from engagement with the receptacle the biasing spring will shift the stud to the ejected position. Mounting of the stud to the one member is facilitated by a resistant interference fit between the cam follower and a keyhole formed on the receiving surface.

2 Claims, 12 Drawing Figures

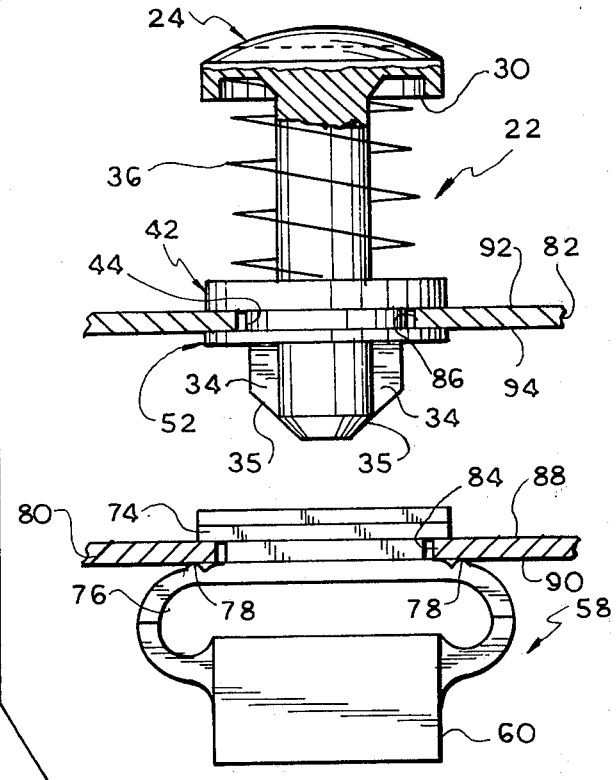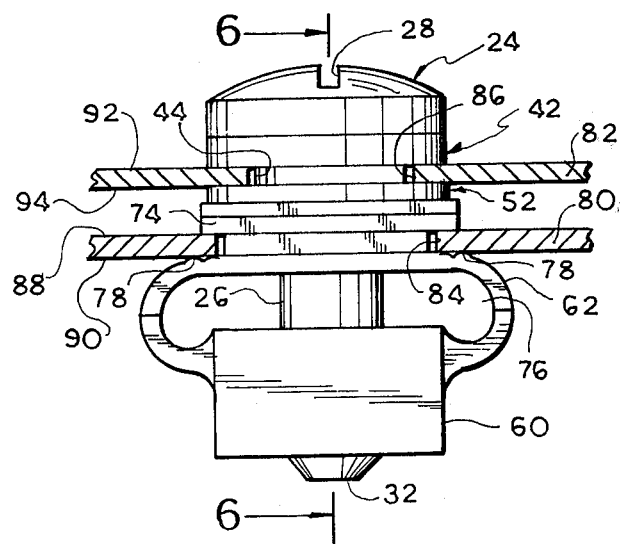

SELF-EJECTING FASTENER STUD

BACKGROUND OF THE INVENTION

Fastener assemblies of various different shapes and sizes are available in many different environments. One common type of fastener assembly is a quarter turn fastener. This type of fastener is particularly useful in fastening two members together, for example, two panels where a positive retention force is required to hold the panels in the closed position and yet permit easy and quick separation of the panels of the open position. For this purpose, quarter turn fasteners can be opened and closed by merely a quarter turn relative rotation of components of the fastener assembly.

Quarter turn fasteners generally include a stud member and a receptacle member. Different types of cam surfaces and cam followers are employed to achieve the desired locking and unlocking action of the fasteners. Naturally it is always desirable to provide the most inexpensive to manufacture and efficient to utilize assembly of a minimum number of components.

One difficulty that is encountered with quarter turn fasteners is the fact that, while it is easy to shift the stud and receptacle portions between the locked and unlocked positions, it is often difficult to axially separate the members to achieve relative displacement of the two panels or members being held. This difficulty is aggravated in many instances because it is desirable to have the stud and receptacle members in recessed or otherwise inaccessible positions so that the aesthetic appearance of the panel structure is enhanced and also so that there is minimum projection of parts of the fastener assemblies that might interfere with regular activities conducted in the vicinity of the panels.

With this in mind, some types of self-ejecting fastener assemblies have been developed. In general, these self-ejecting assemblies require additional structure or operational steps to achieve ejection action or for otherwise exposing portions of the fastener assembly to facilitate grasping and opening of the assembly. The result is enlarged, complex and expensive projecting portions on the assembly.

It is clear that it would be extremely desirable, in addition to maintaining a low cost and easy to operate assembly, to provide a compact self-ejecting assembly in which the ejection components are unexposed and non-projecting when the assembly is fastened.

Another concern in connection with fasteners of this type, is to provide an inexpensive, efficient and positive means for mounting the stud to one of the members to be fastened and to be coupled with the receptacle on the other member being fastened. There are a variety of different mounting structures and most require some separate mounting elements and a number of operative time consuming steps for performance of the coupling operation.

SUMMARY OF THE INVENTION

With the above background in mind, it is among the primary objectives of the present invention to provide a low cost efficiently operated fastener assembly employing a unique self-ejecting fastener stud. The stud is designed to cooperate with a receptacle to form a quarter turn type fastener to hold two members such as panel members together.

It is an objective to provide a stud which is insertable through an opening in one member to be fastendd and coupled with a receptable mounted on another member to be fastened. The stud is designed so that it has an appropriate cam follower to cooperate with the cam surface on the receptable whereby a quarter turn relative rotation between the receptacle and stud will transfer the stud between the fastened and unfastened positions.

A further objective of the present invention is to provide a stud assembly with biasing means on the stud so that when it is rotated to the unfastened position the biasing means will be activated to eject the stud to an ejected position spaced from the surface of the member on which it is mounted to facilitate grasping of the stud after having facilitated separation of the stud from the receptacle. In this manner, the stud and an attached member can be easily separated from the receptacle and an attached second member.

The stud of the present invention is designed so that it can be easily axially shifted from an ejected position spaced from a member on which it is mounted to a inserted position with the head of the stud adjacent the surface of the member on which it is mounted and the shank of the stud extended into a receptacle on a second member wherein rotation of the stud will shift it to the fastened position to hold the member on which the stud is mounted to the member on which the receptacle is mounted.

A further objective of the present invention is to provide a stud with an enlarged head and a shank extending therefrom with a cam follower on the end of the shank distal from the head portion adapted to engage a cam surface on a receptacle so that relative rotation of about quarter turn will shift the stud and receptacle between fastened and unfastened positions. The stud is provided with a slot in the head portion to facilitate rotation thereof. A helical spring surrounds part of the shank and has one end engaging the undersurface of the head and the other end adapted to engage a fixed surface on a member on which the stud is mounted. The helical spring is biased when the stud is shifted to an inserted position with the head adjacent the surface of the member and the stud rotated into locking engagement with the receptacle to the fastened position. Rotation to the unfastened position will release the biased compressed spring and the spring will automatically force the head away from the adjacent surface of the member to an ejected position to facilitate grasping of the stud and separation of the fastener elements and the members to which they are fastened.

A further objective is to provide a retention means for the stud when it is mounted on a member to be fastened. The retention means being spaced from the head permitting the stud to be shifted between two relative positions one with the head adjacent to the member and one with the head spaced from the member to thereby permit the stud to be inserted into the receptacle and to be shifted outward from the receptacle during the unfastening operation to permit separating of the two members being fastened by the assembly.

A further objective is to provide a recess in the undersurface of an enlarged head of a fastener stud to capture and hold a helical spring so that the stud can be inserted into the receptacle until the undersurface of the head is substantially flush with the surface of the member on which the stud is mounted with the compressed helical spring being substantially captured in the recess on the undersurface of the head. Thereafter, when the stud is rotated to the unfastened position, the spring will direct the stud head away from the member on which the stud is mounted to an ejected position and remove the shank of the stud from the receptacle facilitating separation of the fastener assembly parts and opening of the two fastened members.

A further objective is to provide an alternate form of stud in which a collar is positioned in surrounding relationship with respect to part of the shank of the stud and has a portion frictionally held in an opening in the member on which the stud is mounted. The collar has a projecting portion extending upward from the surface of the member on which the stud is mounted facing the head of the stud to form a cup. A helical spring is positioned within the cup so that when the stud is axially shifted to an inserted position and into a receptacle, the head engages the projection of the collar. The helical spring is captured within the cup and is compressed and biased in that position. When the stud is rotated and unfastened, the spring will direct the stud to the ejected position with the head spaced away from the cup and the member on which the stud is mounted facilitating removal of the stud from the receptacle and opening of the two panel members.

A further objective of the invention is to provide a retention means for the stud assembly including a split ring washer frictionally engaging the end of the shank extending through an opening in a member to be fastened so that the member is captured between the retention washer and the enlarged head on the stud. A helical spring is captured between the undersurface of the head and the adjacent surface of the member to bias the stud into an ejected position. The stud is shiftable between an inserted position with the head adjacent the one member and an ejected position with the head spaced from the one member. The distance of travel of the stud shank within the opening in the one member is limited by the enlarged head in one direction and the retention washer in the other direction.

The stud of the present invention is self-ejecting so that when it is shifted to the open position with respect to a receptacle, biasing means in the form of a helical spring on the stud will direct the stud away from engagement with the receptacle. When the stud is mounted on one member and the receptacle is mounted on another member, the stud is shiftable to a position substantially flush with the surface of the member on which it is mounted when it is fastened with the receptacle mounted on the other member to hold the two members together. It is an objective to provide biasing means on the stud which will automatically shift the stud away from the one member and expose a substantial portion thereof for ease of grasping and removal of the stud from the receptacle and separation of the two members.

A further objective is to provide a stud assembly with a minimum number of inexpensive component parts and designed for use with a conventional type of receptacle.

The self-ejecting stud of the present invention is designed for use in panel environments and in other environments where quarter turn fasteners are commonly used.

The head of the stud is designed with a slot so that it can be easily shifted a quarter turn between the open and closed positions. The shank has conventional diametrically opposed lugs extending from opposite sides of the shank for engagement with appropriate spiral cam slots in a receptacle so that quarter turn rotation between the receptacle and the stud will shift the components between unfastened and fastened conditions. The receptacle is provided with built-in spring means to accommodate the axial movement as the lugs travel along the spiral slot.

The stud is provided with a spring means, for example a helical spring surrounding a part of the shank of the stud assembly which biases the stud to the ejected position to facilitate opening of the members connected by the stud and its receptacle when the stud is mounted on one of the members and the receptacle is mounted on the other. The stud assembly is provided with appropriate means to form a recess to hide the spring when the stud is in the inserted position engaged with a receptacle. In one form, the recess is formed in the undersurface of the enlarged head of the stud and in another form, the recess is formed in a collar surrounding the stud and frictionally held in the opening passing through the one member on which the stud is mounted.

Alternative to the use of a collar, a recess in the panel can be provided for housing the spring when the stud is shifted into the inserted position and engaged with the receptacle. With this in mind, it is possible to directly inject the stud and spring into a keyhole in the member on which it is mounted and provide a retainer to hold the stud in position such as a split ring washer. With that type of structure the collar would not be required.

Either the panel or the column may be provided with an interference fit keyhole with a shape corresponding to the end of the shank of the stud containing the cam follower and being slightly smaller. At least one of the mating surfaces is formed of resilient material so that application of a sufficient amount of force will cause the cam follower and stud to pass through the keyhole. The shape of the cam follower facilitates introduction of stud through keyhole and deters withdrawal back through keyhole.

To facilitate the interference fit, the engagement it is possible to form the stud of a resilient plastic material and, also the collar if one is used. Additionally, it is contemplated that the cam follower on the stud shank can be formed by lugs extending perpendicular to the axis of the shank and forming lateral projections. Each lug has a beveled leading edge adjacent the end of the shank distal from the head end and a trailing edge perpendicular to the axis of the shank to form a shoulder spaced from the head end. In this matter, the beveled or tapered leading edge facilitates insertion of the stud through the keyhole and the perpendicular trailing edge of the cam follower prevent withdrawal back through the keyhole. It is also contemplated that two lateral projections be placed in diametrically opposed positions on the stud with the beveled leading edges and the perpendicular trailing edges being aligned. The complementary mating recess in either the collar or the one member or both has a configuration corresponding to the cross section of the stud at the location of the lateral projections, but slightly smaller in size.

In those embodiments where the interference fit keyhole is employed, the split ring retainer is optional.

Additionally, when the interference fit keyhole is used with the collar, the stud, helical spring and collar can be preassembled and shipped to the customer without concern for the parts separating. At destination, the stud can be easily mounted on a panel and be self retained.

It is also contemplated that the interference fit arrangement of the embodiments can be employed with or without the self ejecting helical or conical spring.

In summary, a self-ejecting fastener stud is provided for use with a fastener receptacle to form a fastener assembly for fastening two members together. The stud has an enlarged head portion and a shank portion extending therefrom adapted to extend through an opening in one of the members to be fastened and to engage with a receptacle mounted on the other of the two members to be fastened. The stud has a cam follower thereon for engagement with a cam surface on the receptacle and relative rotation therebetween will shift the stud and receptacle between fastened and unfastened positions. Retention means is provided to retain the stud on the one member shiftable between an inserted position with the head adjacent the one member and an ejected position with the head spaced from the one member. Biasing means is on the stud tending to direct the stud toward the ejected position so that when the stud is released from engagement with the receptacle the biasing means will shift the stud to the ejected position. With or without use of the self-ejecting means, the cam follower can be formed for an interference fit with a receiving keyhole on the member to which it is to be mounted and/or a collar adapted to be coupled with the stud and mounted to the one member. Coupling of the interfering members is facilitated by the configuration of the keyhole being the same but slightly smaller than the cross section of the stud at the location of the cam follower. Also, at least one of the cam follower and the surfaces in which the keyhole is formed is of resilient material to permit coupling therebetween. The cam follower is formed by at least one lug on the stud and having a leading edge at the tip of the stud with a beveled configuration and a trailing edge perpendicular to the axis of the shank of the stud to form a shoulder. Beveled leading edge facilitates introduction of the stud through the keyhole and the perpendicular trailing edge forms an interference fit with the keyhole and prevents removal of the stud from the keyhole.

With the above objectives among others in mind, reference is made to the attached drawings.

BRIEF DESCRIPTION OF THE DRAWINGS

In The Drawings:

FIG. 2 is a sectional side elevation view thereof with the stud mounted on one member and the receptacle mounted on another member to be fastened together;

FIG. 3 is a sectional side elevation view thereof with a stud and receptacle being fastened together and holding the two members together;

DETAILED DESCRIPTION

Figure 1:
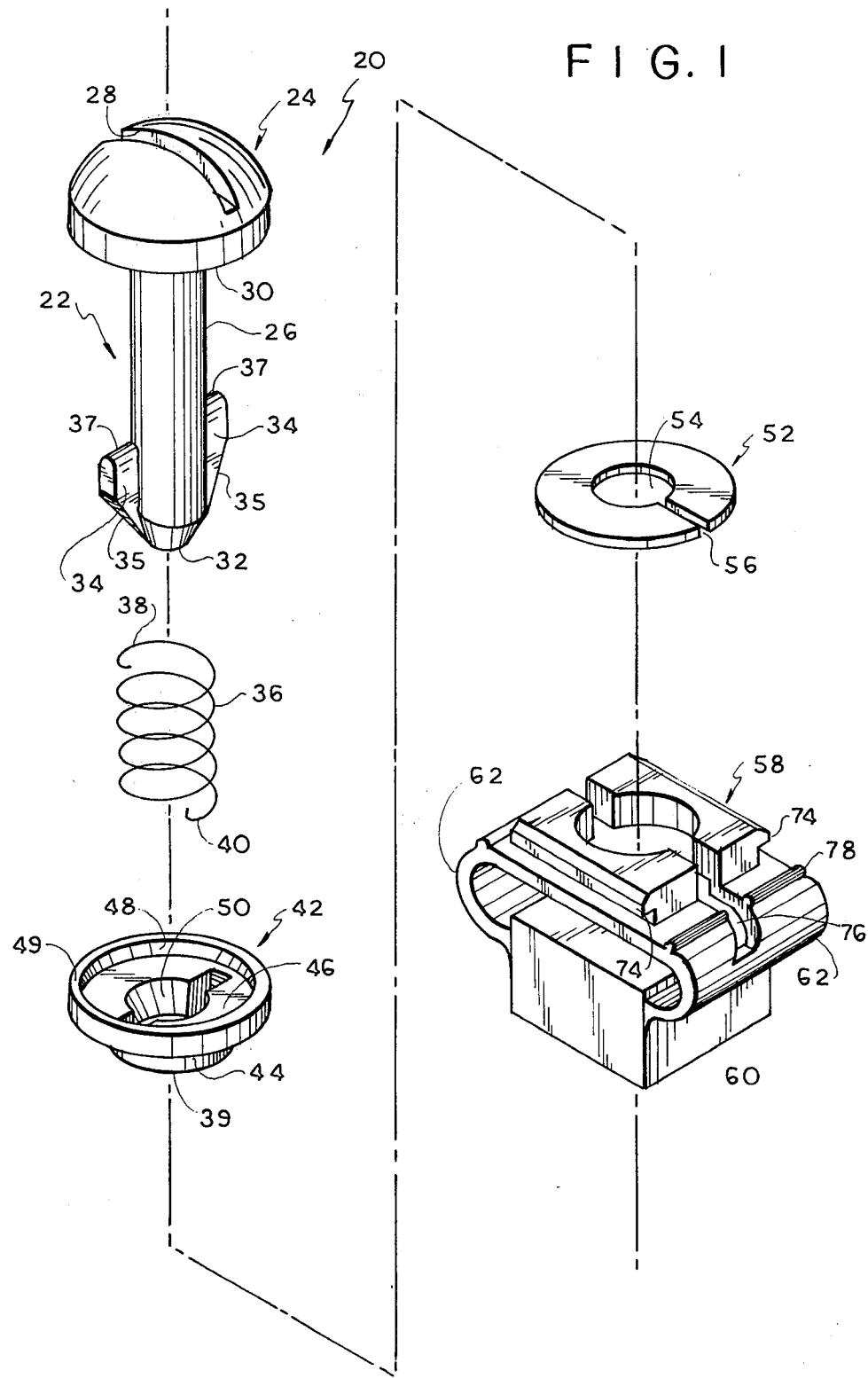
FIG. 1 is an exploded view of the self-ejecting fastener stud of the invention and a receptacle to be coupled therewith.
Figure 4:
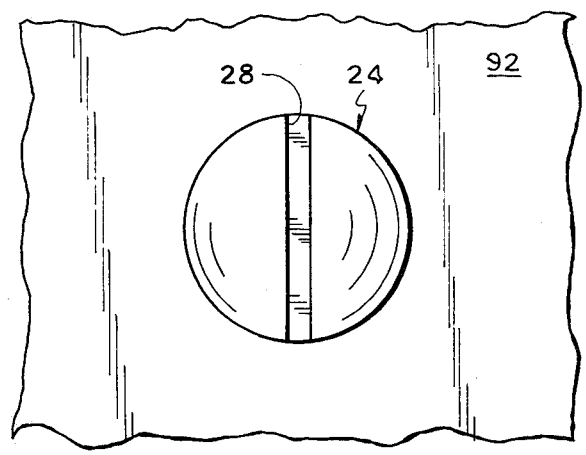
FIG. 4 is a top plan view thereof with fragmentary portions of the members being held together.
Figure 5:
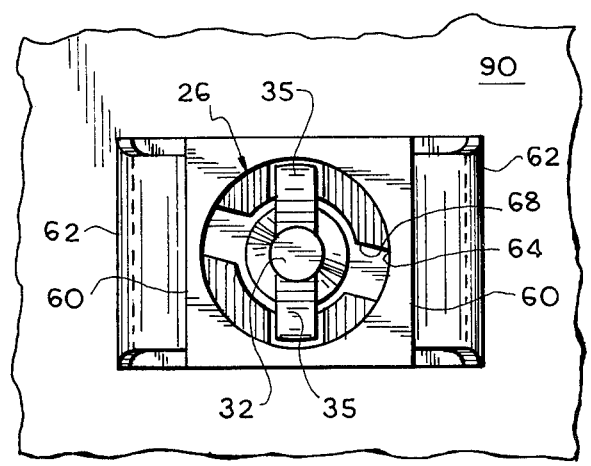
FIG. 5 is a bottom plan view thereof with fragmentary portions of the two members being held together.
Figure 6:
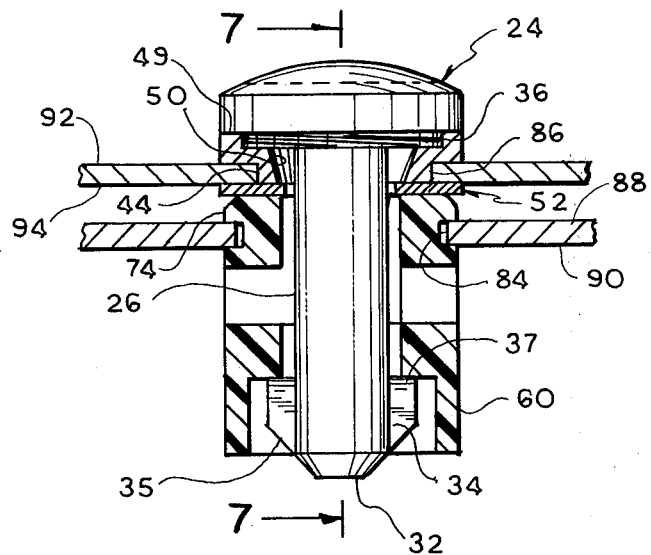
FIG. 6 is a sectional elevation view thereof taken along the plane of line 6—6 of FIG. 3.
Figure 7:
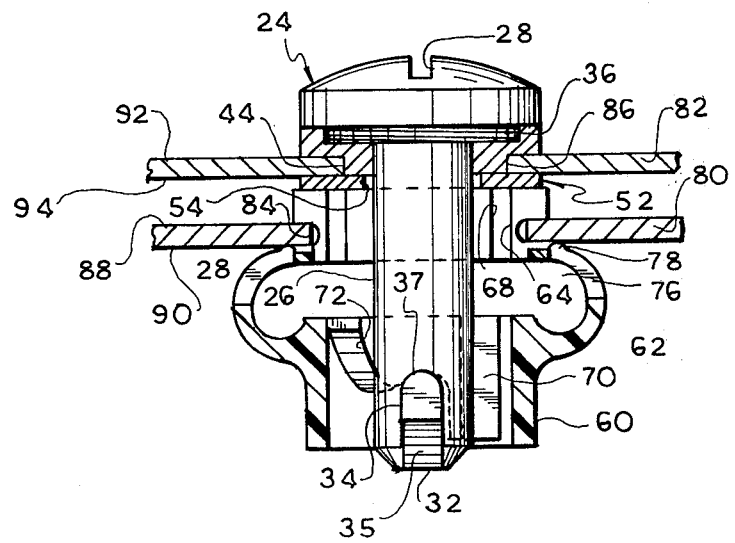
FIG. 7 is a sectional side elevation view thereof taken along the plane of line 7—7 of FIG. 6.
Figure 8:
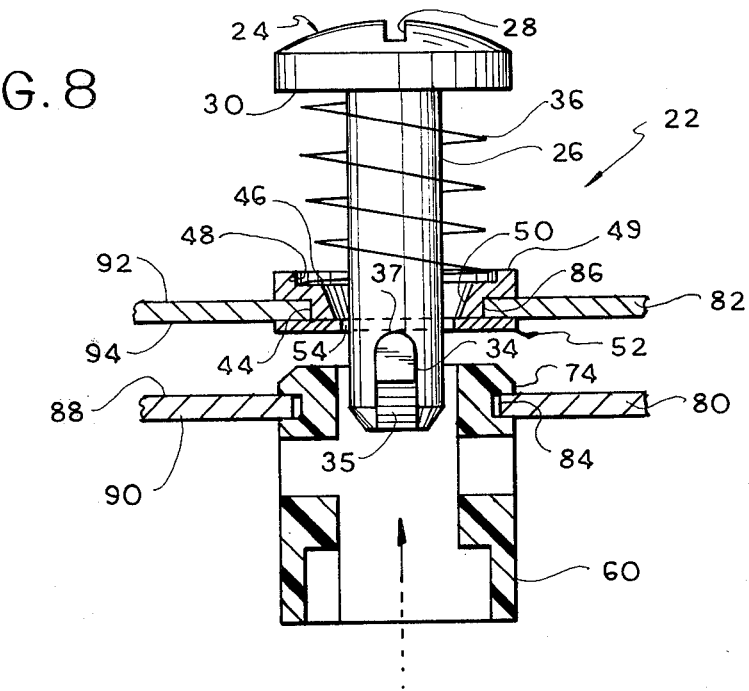
FIG. 8 is a sectional side elevation view thereof with the stud and receptacle having been unfastened and the stud ejected from the receptacle.

Self-ejecting stud assembly 20 of FIGS. 1-10 includes a stud 22 having an enlarged head portion 24 and a lesser diameter shank 26 extending from the head. The upper surface of head 24 includes a slot 28 for insertion of a tool for rotating the stud.

Shank 26 extends from the undersurface 30 of head 24 until it reaches a distal end 32. Adjacent to distal end 32 is a pair of diametrically opposed lateral projections or lugs 34 extending outwardly from shank 26 to form a cam follower. The leading tip 32 of the shank is beveled to facilitate its insertion into an opening during use.

Surrounding a portion of the shank 26 is a helical spring 36. One end 38 of the spring engages the undersurface 30 of head 24 and the other end 40 of spring 36 engages a collar 42.

Figure 10:
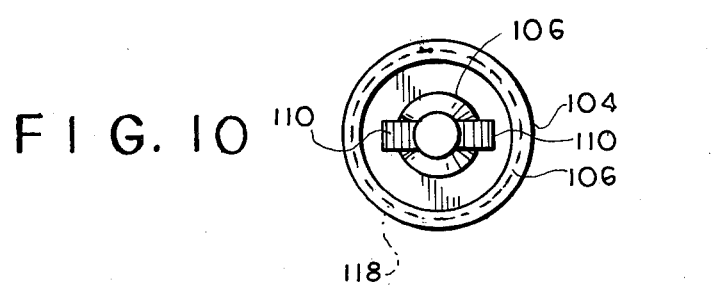
FIG. 10 is a bottom plan view of the collar portion of the stud.

Collar 42 includes a reduced diameter annular neck 44 extending downward from a relatively flat disc-shaped base 46. On the other side of base 46 from neck 44 extends an annular projection 48 to form a cup. Centrally located on base 46 is an aperture 50 in the form a keyhole, as shown in FIG. 10, conforming to the shape of shank 26 and lugs 34 thereon to permit passage of the shank 26 therethrough. The keyhole 50 is slightly smaller in size than the lugs and shank to provide an interference fit. At least one of the stud and collar is formed of resilient material to permit insertion of the stud shank through the keyhole upon application of a small amount of force. In the depicted embodiment, both the stud and collar are formed of resilient plastic material. Helical spring 36 has a larger diameter than keyhole 50 and accordingly abuts against base 46. Similarly, the undersurface 30 of head 24 of stud 22 is larger than projection 48 and abuts against the rim 49 of the projection when the stud shank is inserted through keyhole 50.

The remaining element of self-ejecting fastener stud 20 is a retention washer 52. The washer has a central opening 54 larger than the diameter of the stud shank and lugs and has an interruption 56 on its annular surface. Washer 52 is formed to act as a conventional split washer so that it will resiliently engage the surface of shank 26 when in surrounding engagement therewith after the shank 26 has been extended through opening 54 of the washer.

The presence of washer 52 is optional since the stud is retained in position by the interference fit between the stud and collar. The washer provides an additional retainer against accidental disassembly.

Lugs 34 are shaped to facilitate the interference fit with keyhole 50. For this purpose the leading edge 35 of each lug 34 is beveled or tapered and the trailing edge 37 of each lug 34 is perpendicular to the axis of shank 22. Thus, when shank 26 along with lugs 34 is forced through keyhole 50 the beveled leading edges 35 of the lugs will facilitate insertion. Thereafter, any attempt to withdraw shank 26 from collar 42 will be resisted by the perpendicular shoulder 37 formed on each lug in engagement with the bottom rim 39 of the collar or, if retainer washer 52 is utilized, the larger diameter undersurface of the washer.

Stud 22 is adapted to be used with a conventional receptacle 58. The receptacle 58 includes a receptacle base 60, two C-shaped webs 62 and a mounting portion 64 formed with a securing boss 66. These parts together form a continuous closed loop.

The securing boss 66 and the base 60 are formed with aligned holes 68 and 70 respectively. The surfaces forming hole 70 are provided with a pair of symmetrically arranged opposing cam surfaces 72 each consisting of a part helical portion and an idented portion which terminates in a stop. The helical or spiral surfaces 72 conform in size and configuration to lugs 34 of stud 22 so as to provide a quarter turn fastening and unfastening action with relative rotation between the coupled stud and receptacle.

The resilient C-shaped web 62 forms a spring for facilitating the fastening action with stud 22 by permitting the axial movement as the lugs move along the spiral slot.

Boss 64 includes a flange 74 on two opposing edges for coupling with a panel. The coupling action is facilitated by a central slot 76 formed in the boss 64 and a portion of the C-shaped web 62. Abutments 78 on the upper surface of web 62 form engagement surfaces for the underside of the member on which the receptacle is mounted.

In use as shown in FIG. 2, receptacle 58 is mounted to a member or panel 80 and stud 22 is mounted to an adjacent panel 82. The members or panels 80 and 82 are conventional elements of structure, for example as part of a door and support for a cabinet or components on an automobile.

Both panels have apertures therethrough with panel 80 having opening 84 and panel 82 having opening 86 therein. The openings 84 and 86 are aligned.

All of the components of stud assembly 20 and receptacle 58 are formed of conventional material with appropriate resilience being provided for the necessary mounting and coupling actions. It is convenient to form the helical spring of steel and all of the remaining components of resilient plastic.

Receptacle 58 is mounted in opening 54 of panel 80 by grasping the two split portions of boss 64 and forcing them toward one another as permitted by slot 76. The boss can then be inserted through rectangular opening 84 in panel 80 until the boss extends above the upper surface 88 of panel 80 and the receptacle base 60 and C-shaped web 62 are located below undersurface 90 of panel 80. Release of the boss halves will then permit them to snap into position mounting the receptacle to the panel. The panel will be captured between the undersurface of flanges 74 on boss 64 and the upper surface of the C-shaped web, in particular the projections 78. Openings 68 and 70 in the receptacle will be in alignment with the opening 84 through the panel.

Helical spring 36 is placed on shank 26 from the distal end and then stud 22 is mounted to panel 82 by extending the distal tip 32 of the stud through opening 86 in panel 82 from the upper side 92 thereof until distal tip portion 32 and lugs 34 are beneath the underside 94 of panel 82.

Figure 9:
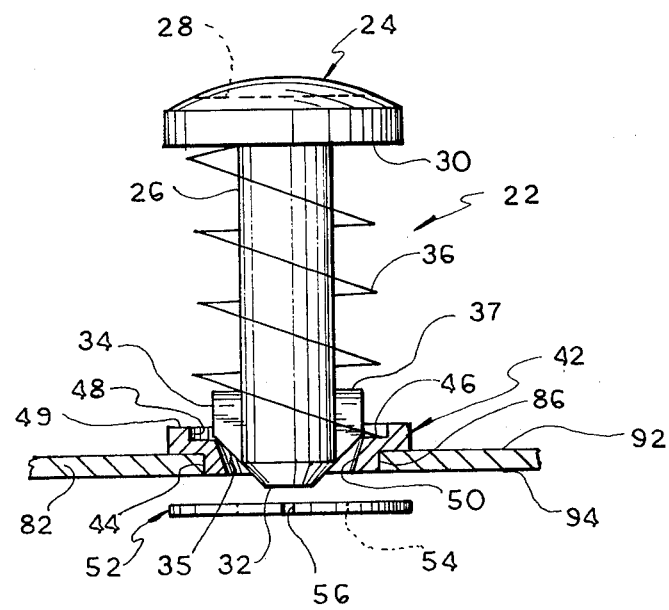
FIG. 9 is a partially sectional side elevation view thereof prior to coupling of the stud and collar.

Prior to insertion of the stud through opening 86, collar 42 is mounted in the opening. This is accomplished by extending annular neck 44 into the annular opening 86 of the panel until it is mounted therein with frictional interengagement therebetween. The undersurface of base 46 of collar 42 will abut upper surface 92 of the panel. This arrangement is depicted in FIG. 9.

Distal portion 32 and lugs 34 of stud 22 are then forced through aligned keyhole 50, with the assistance of beveled leading edges 35 on lugs 34, and extended through opening 86 to the underside 94 of panel 82. Retaining washer 52 is then placed on shank 26 above lugs 34 and in abutment with the undersurface 94 of the panel to assist in retaining stud 22 on the panel. Any attempt to remove the stud will be prevented by engagement between the trailing edge 37 on each lug 34 and the surface of washer 52. If washer 52 is not used, removal of the stud will still be prevented by engagement between lugs 34 and the surface surrounding keyhole 50 on collar 42.

Axial movement is permitted with the limitations of movement being determined by the distance between the cam 72 and the undersurface 30 of head 24 of the stud. Movement in one direction will be limited by engagement between retainer 52 and undersurface 94 of panel 82 and movement of the stud in the other axial direction will be limited by engagement between undersurface 30 of head 24 and the rim 49 of collar projection 48 of collar 42.

Helical spring 36 on shank 26 will always be partially compressed and biased between the undersurface of head 30 and the base 46 of collar 42. This is accomplished by providing a spring with a relaxed length slightly larger than the distance between the head and the collar when the stud is positioned at its fully outward position and the edge of lugs 34 abut against retainer washer 52 which in turn abuts against the undersurface 94 of the panel as shown in FIG. 2.

With stud 22 mounted on panel 82 and receptacle 58 mounted on panel 80, the fastener stud and receptacle can then be interengaged and fastened holding panels 80 and 82 together. This is accomplished by inserting distal part 32 and lugs 34 of stud 22 through aligned openings 68 and 70 in the receptacle 58. Abutment will occur between retainer washer 52 and the upper surface of boss parts 64. This limits the movement of panel 82 with respect to panel 80. Stud 22 is then extended further into the receptacle by further compressing and biasing helical spring 36 until the undersurface 30 of head 24 abuts against the upper edge of collar projection 48. In this position, lugs 34 will be in alignment with spiral cam surfaces 72 in the receptacle base 60. An approximate quarter turn rotation of the stud is facilitated by engaging slot 28 in the head with an appropriate tool and rotating the stud 22 with respect to the receptacle 58 which is retained in fixed position by the mounting of the rectangularly shaped boss 64 in the rectangularly shaped aperture 84 of panel 80.

Lugs 34 will move along the opposing cam slot 72 and axial movement will be accommodated by the C-shaped web 62 acting as a spring for the receptacle. This action will pull the panels 80 and 82 into right interengagement under the spring force of compressed C-shaped webs 82. Helical spring 36 will have been compressed entirely within the cup formed by collar projection 48 so that it will not be visible. This is the complete fastened condition as shown in FIGS. 3–9. There is only minimum projection of stud head 24 above the exposed surface 92 of panel 82 and the remainder of the stud and fastener assembly are covered or recessed behind the panels.

The assembly can be opened in a quick and efficient manner by merely placing an appropriate tool in slot 28 of head 24 and rotating the stud relative to the fixed retainer in the opposite direction for the corresponding approximate quarter turn to the unfastened position. At that time, lugs 34 will be free of slots 72 and compressed spring 36 will tend to return to the relaxed position thereby self-ejecting the stud from the receptacle base, as shown in FIG. 8, until lugs 34 again abut against the undersurface of retainer washer 94. In this condition as shown in FIG. 2, the stud head and the majority of the shank 26 will have been shifted to an ejected position and spaced from the upper surface 92 of panel 82. The stud 22 can then be grasped and the coupled stud and panel 82 easily removed from the unfastened panel 80 and receptacle 58. Rotation to the unfastened position automatically frees spring 36 to shift the stud to the ejected position in contrast to the inserted position where it is coupled with the receptacle.

Figure 11:
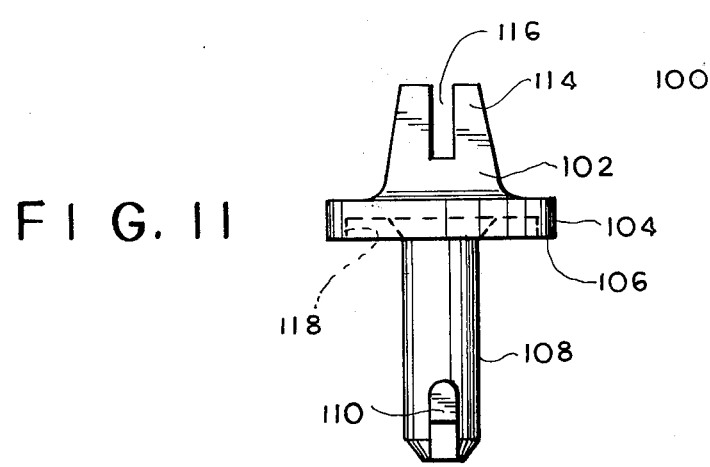
FIG. 11 is a side elevation view of an alternative embodiment of the self-ejecting fastener stud.
Figure 12:
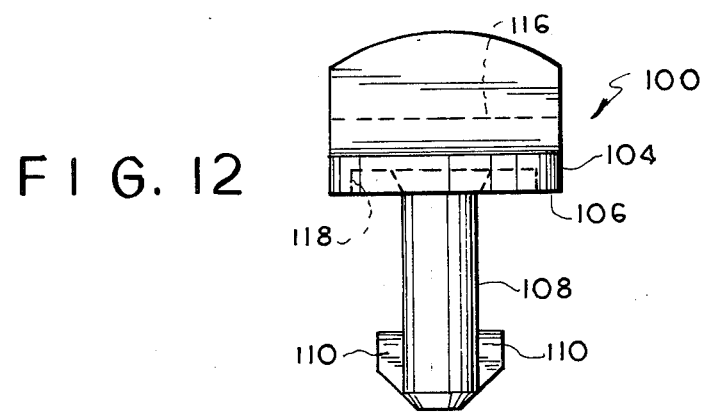
FIG. 12 is a side elevation view of the embodiment of FIG. 11 rotated 90°.

An alternative stud design is depicted in FIGS. 9 and 10. Stud 100 of FIGS. 11 and 12 is used with the same receptacle 58 and for this purpose includes a shank 108 extending from an enlarged head 102. Shank 108 terminates in a beveled distal tip 112 and has a pair of opposing lugs 110 adjacent to tip 112 correspond to tip 32 and lugs 34 of shank 22 of the embodiment of FIGS. 1–10.

The enlarged head includes an annular base portion 104 having an undersurface 106 corresponding to the undersurface 30 of head 24 of stud 22. Above annular base 104 is a wing-shaped gripping projection 114 having a central slot 116 for use of a tool if desired. However, the enlarged gripping wing-shaped portion 114 provides a sufficient surface for manually gripping and rotating the fastener between the fastened and unfastened position with respect to receptacle 58.

Helical spring 36 is mounted on shank 108 in a similar manner as it is mounted on shank 26 of stud 22. A further difference in stud 100 from stud 22 is in the recess for housing spring 36 when it is in the fully collapsed position. In stud 100 a recess 118 is formed in the undersurface of annular base portion 104 of the head to house the spring when the stud is fully inserted and coupled with the receptacle. This is in contract to the cup formed by the projection 48 of collar 42. Thus, collar 42 is not required when stud 100 is utilized. When the stud 100 is fully inserted, undersurface 106 of annular portion 104 will abut against the upper surface 92 of panel 82 and compressed spring 36 will be housed in recess 118 and not visually exposed. The only projection above panel 82 will be head 102.

The interference fit for mounting the stud 100 to panel 82 is provided by forming a keyhole opening corresponding to the keyhole of collar 42 directly in the panel 82. Thus, opening 86 of the panel 82 would be formed as a keyhole and collar 42 is not needed.

Rotation is accomplished in the same manner as with fastener stud 100 to couple it with receptacle 58. Rotation of one quarter turn in the opposite direction will free lugs 110 from cam surfaces 72 and automatically, compressed spring 36 will expand and self-eject stud 100 from the receptacle and project the major portion of the stud above upper surface 92 of panel 82. Full ejection will be prevented again by the abutment between lugs 110 and the undersurface of an appropriate retainer washer 52 or on the surface surrounding the opening in the panel 82 if a washer 52 is not employed.

In the embodiments of FIGS. 1–10 and FIGS. 11–12, the head configuration of the two studs are interchangeable. The interference fit keyhole and lug arrangement can be used with or without the self-ejecting spring and visa-versa. In the absence of the interference fit keyhole, another retaining means for the lugs would be used, such as retainer washer 52. In the absence of the spring, the stud is removed from the receptacle by hand after rotation to the released positions.

Alternatively, the recess for retaining the fully compressed spring 36 can be built into the panel surfaces, depending upon the environment and panel structure available, thus alleviating the necessity of the projecting portion 48 of collar 42 or the recess 118 in the undersurface of head 102 of stud 100.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. In a self-locking quick acting fastener of the type having a receptacle and a stud interengageable therewith upon relative rotation, the improved self-ejecting fastener assembly comprising:

a stud element having an enlarged head portion and a shank portion extending therefrom and having coupling means near its opposite end for locking interengagement with the receptacle, said head portion having a dependent peripheral flange forming an annular recess in the undersurface of the head;

a collar member positioned on and slidable along the shank portion of the stud element and having a central opening through which the shank portion of the stud element extends and which has a configuration generally similar to but smaller than the combined cross-section of the shank portion and coupling means, said collar portion being made of resilient material so that distention of the material permits insertion of the coupling means and shank portion of the stud through the central opening but providing a frictional fit that will prevent accidental removal of the collar member therefrom, said collar member having an upstanding flange of the same diameter as the flange on the head portion of the stud element and in alignment therewith forming a recessed upper surface on the collar member; and a spring member surrounding the shank of the stud member and extending between the undersurface of the head portion and the collar member, to normally hold them in spaced relationship, but so as to permit the shank portion to be projected through the collar member so that the coupling means can be interengaged with the receptacle upon rotation of the stud member and so that the flange of the head portion of the stud element engages the flange of the collar member forming an enclosed recess with the spring being encased therein.

2. In a self-locking quick acting fastener of the type having a receptacle and stud engageable therewith upon relative rotation, the improved self-ejecting fastener assembly as set forth in claim 1, in which the coupling means comprises projections extending from opposite sides of the shank portion of the stud member and the central opening in the collar member is of a generally keyhole configuration.

* * * * *